C. E. HERSHEY.
ANTISKIDDING DEVICE FOR USE ON AUTOMOBILE WHEELS.
APPLICATION FILED MAY 9, 1916.

1,219,397.

Patented Mar. 13, 1917.
2 SHEETS—SHEET 1.

Inventor
Charles E. Hershey

Witnesses

By Victor J. Evans
Attorney

C. E. HERSHEY.
ANTISKIDDING DEVICE FOR USE ON AUTOMOBILE WHEELS.
APPLICATION FILED MAY 9, 1916.

1,219,397.

Patented Mar. 13, 1917.

Witnesses

Inventor
Charles E. Hershey
By Victor J. Evans
Attorney

UNITED STATES PATENT OFFICE.

CHARLES E. HERSHEY, OF MECHANICSBURG, PENNSYLVANIA.

ANTISKIDDING DEVICE FOR USE ON AUTOMOBILE-WHEELS.

1,219,397.  Specification of Letters Patent.  Patented Mar. 13, 1917.

Application filed May 9, 1916. Serial No. 96,377.

*To all whom it may concern:*

Be it known that I, CHARLES E. HERSHEY, a citizen of the United States, residing at Mechanicsburg, in the county of Cumberland and State of Pennsylvania, have invented new and useful Improvements in Antiskidding Devices for Use on Automobile-Wheels, of which the following is a specification.

This invention is an improved automobile wheel anti-skidding device, the object of the invention being to provide an improved device of this character which is adapted to be readily secured on the inner side of an automobile wheel and which is controlled by a lever arranged conveniently for use by the chauffeur, so that the head of the anti-skidding device can be readily extended when required and to cause the spurs thereof to engage the road surface and thereby prevent skidding; another object of the invention being to provide an improved device of this character which is automatic and positive in operation.

The invention consists in the features of construction, combination, and arrangement of devices, hereinafter described and claimed.

In the accompanying drawings:—

Figure 1:
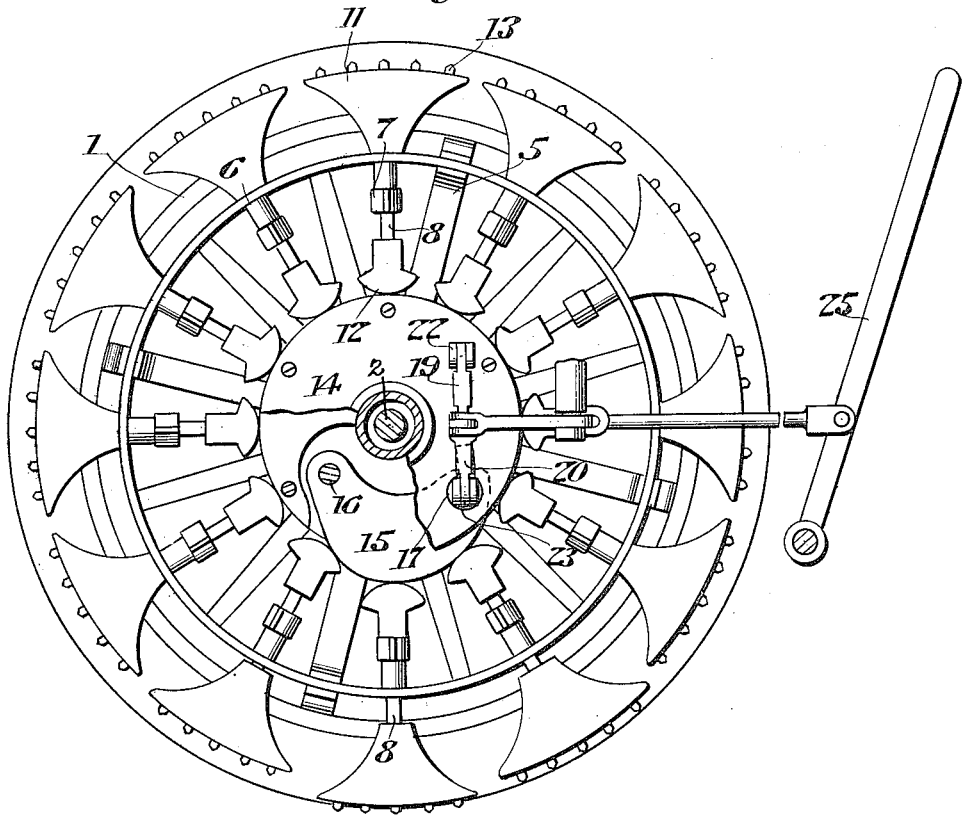
Figure 1 is an elevation of an anti-skidding device constructed and arranged in accordance with my invention and showing the same on the inner side of an automobile wheel, and also showing the automobile rear wheel axle casing in cross section and showing the cam casing partly in elevation and partly in section.
Figure 2:
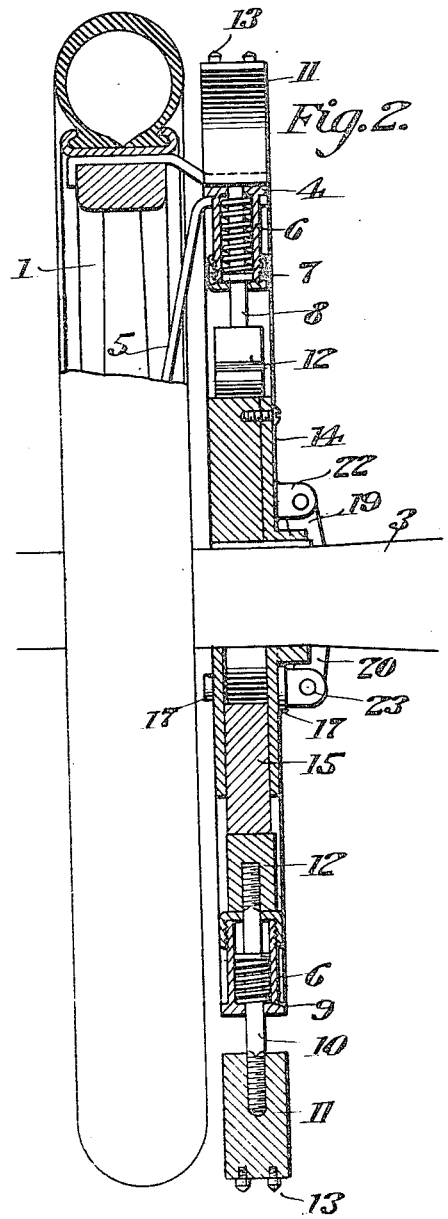
Fig. 2 is a detail sectional view of the same on a larger scale.
Figure 3:
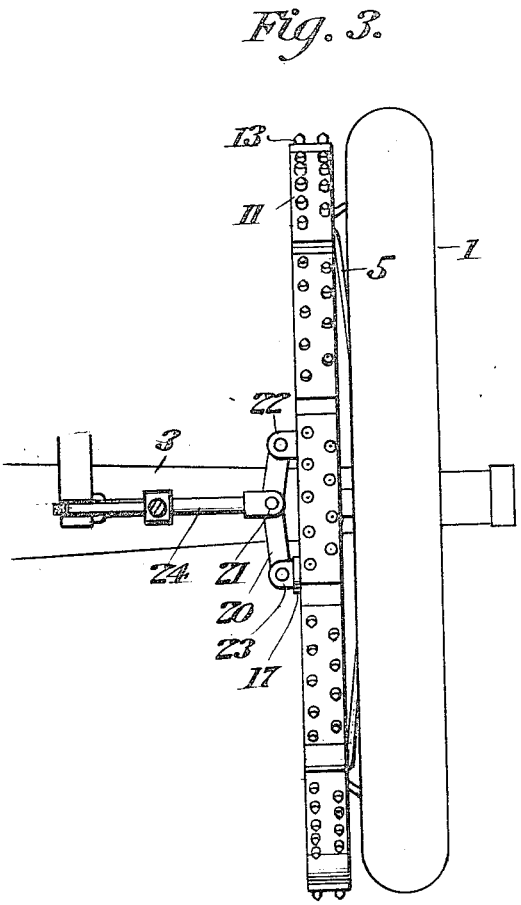
Fig. 3 is an elevation at right angles to Fig. 1.

An automobile wheel is indicated at 1 and a rear axle shaft at 2, inclosed in the usual casing 3. In accordance with my invention I provide a ring 4 of suitable diameter less than that of the wheel and which is secured on the inner side of the wheel and concentrically with respect thereto by suitable means such for instance, braces 5 attached to the said ring and also to certain of the spokes of the wheel. Any suitable means, within the scope of my invention may be employed for securing the ring on the inner side of the wheel.

The ring is provided with a suitable number of radially arranged guides 6 which extend inwardly therefrom and are spaced equidistant apart. These guides are here shown as tubular and each provided at the inner end with a screw cap 7. Radially movable rods 8 extend through the guides and through openings in the ring and are normally moved inwardly by springs 9. Each rod has a square portion 10 and each guide has a square opening engaged by said square portion, so that the rods are prevented from turning. Each rod is provided at its outer end with a head 11 and at its inner end, with a tappet foot 12. The heads form segments and each head is provided on its outer side corresponding with the periphery of the wheel with studs 13 which when engaged with the road surface by the radial projection of the heads prevent the car from skidding as will be understood.

A casing 14 which is here shown as circular, is secured concentrically on the axle shaft casing of the car, at a point in a common plane with the ring and in this casing is a cam 15 which is pivotally mounted as at 16 and near one end for tangential movement and the said cam, which is curved as shown, is provided near its free end with guides 17 which operate in groove slots 18 in the sides of the casing. I also provide a pair of toggle levers 19, 20, which are pivotally connected together as at 21. The lever 19 is pivotally connected to the casing as at 22 and the lever 20 is pivotally connected to one of the guides 18 as at 23. An operating rod 24 which may be actuated by a suitable lever 25 is pivotally connected to the toggle levers at the joint 21 between them.

Normally, the cam is retracted so that it lies within the radius of the casing and the tappet feet 12 of the anti-skidding heads 11 pass by the revolution of the ring with the wheel and without engaging the cam. The cam is arranged in the lower side of the casing. When it is desired to use the device, the rod 24 is operated by the lever to cause the toggle levers to project the cam, by turning the cam on its pivot and so as to arrange the cam beyond the radius of the casing and in the path of the tappet feet. As each tappet foot passes the cam, it is engaged thereby and hence projects the anti-skidding head thus successively causing the anti-skidding heads as they reach the lower side of the wheel to be projected sufficiently to engage their spurs or studs with the road surface and thus effectually prevent their skidding.

Having described the invention, what is claimed is:

A ring for attachment to one side of a wheel and provided with radial guide elements, radially movable rods in said guide elements, each provided at its outer end with an anti-skidding head and at the inner end with a tappet foot and springs to move said rods inwardly in combination with a supporting device for attachment to an axle casing, a cam movably mounted on said supporting device, a pair of toggle levers connected together and one connected to the supporting device and the other to the cam, a lever, and a rod connecting the said lever to the toggle levers to project said cam into the path of the tappet feet to cause said cam to successively radially project the rods and anti-skidding heads as the wheel rotates.

In testimony whereof I affix my signature in presence of two witnesses.

CHARLES E. HERSHEY.

Witnesses:
A. S. HART,
MARY E. MCCARTHY.